Figure 1:
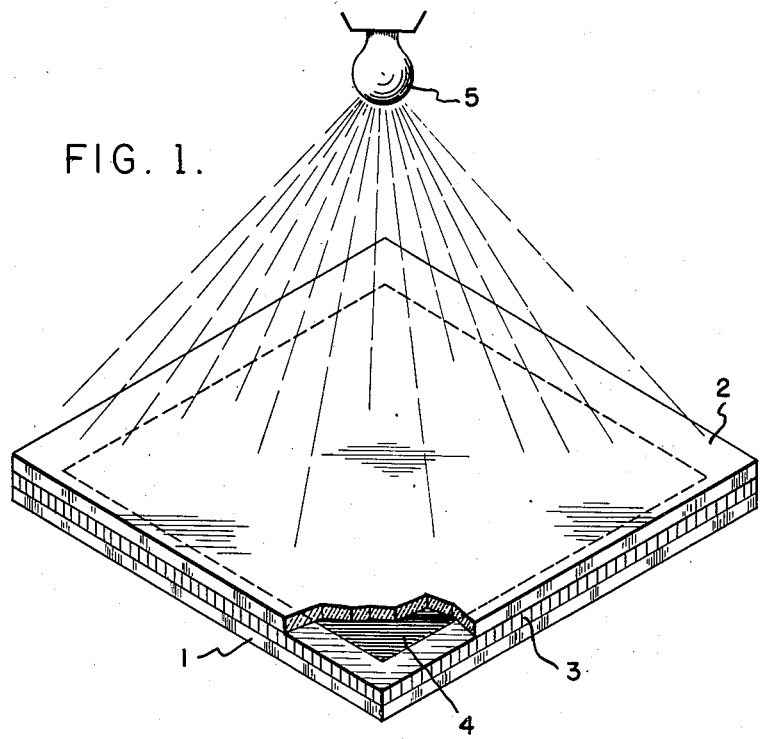

Aug. 30, 1949.  D. C. ROGERS  2,480,752
CAST SYNTHETIC RESIN WITH INTEGRAL SHEEN
Filed March 9, 1948  2 Sheets-Sheet 1

INVENTOR.
Dean Crawford Rogers
BY
ATTORNEY

INVENTOR
Dean Crawford Rogers
BY
ATTORNEY

Patented Aug. 30, 1949

2,480,752

UNITED STATES PATENT OFFICE 2,480,752

CAST SYNTHETIC RESIN WITH INTEGRAL SHEEN

Dean Crawford Rogers, Rutherford, N. J., assignor to E. I. du Pont de Nemours & Company, Wilmington, Del., a corporation of Delaware Application March 9, 1948, Serial No. 13,906

9 Claims. (Cl. 204—158)

1

This invention relates to cast synthetic resin and, more particularly, to the preparation of such resin in the form of sheets and bodies of other shapes having integral sheen.

The term "integral sheen" is used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation, within the material, of lamellae (flat plates, crystals and the like) or substances capable of reflecting light. As regards appearance, the term thus includes the various types of sheen and character of sheen commonly designated, in the plastics industry, by the terms pearly, nacreous, silky, metallic, chatoyant and pearlescent.

Various substances characterized in common by their occurrence in the form of light-reflecting lamellae, have been widely used for the purpose of imparting integral sheen to various transparent or substantially transparent plastics, such as cellulose esters and resin plastics. Such substances, including the so-called pearl essence obtained from fish scales, various inorganic and organic substitutes therefor, and metal bronzing powders, are well known in the art, as are also various methods whereby these lamellae may be brought into systematic orientation so as to yield certain desired visual effects. It is well recognized that to obtain a sheen effect light-reflecting lamellae must be positioned or oriented so that a large percentage of them lie with their broad faces parallel to each other and substantially parallel to the surface of the plastic which is to have the appearance of sheen.

For years cellulose nitrate stock having integral sheen has been used in the manufacture of fountain pens, pencils and the like. Such stock is obtained by various casting, extruding, and layup techniques disclosed in numerous patents. More recently, synthetic resins having integral sheen have been obtained by the incorporation of light-reflecting lamellae in polymerizable liquid organic compounds and subjecting same to polymerizing conditions in a manner that causes orientation of the light-reflecting lamellae. For example, rods and tubes of cast synthetic resin having integral sheen may be prepared by progressive polymerization along the longitudinal axis of a rod mold (Fields et al. U. S. Patent 2,168,331) or by centrifugal casting in a cylindrical mold (Clewell et al. U. S. Patent 2,265,226)

2 of such light-reflecting lamellae-containing polymerizable compounds.

An object of the present invention is to provide a new and improved process of producing cast synthetic resin having integral sheen. A more particular object is to provide cast synthetic resin sheeting having integral sheen and a process of producing such sheets. A further object is to provide a process of producing particular types of patterns in cast synthetic resin, such patterns resulting from the orientation of light-reflecting lamellae.

The above objects are accomplished according to the present invention by forming a suspension of light-reflecting lamellae in a polymerizable liquid organic compound adapted to give a polymer solid at normal temperatures, the suspension having a viscosity of less than 40 poises, introducing the suspension into a mold having one dimension less than the other two and capable of transmitting actinic energy to the contents thereof, subjecting the mold while in substantially horizontal position to a source of actinic energy to induce polymerization of the mold contents until a pattern appears in the polymerizing mass contained in the mold, turning the mold into substantially vertical position before the viscosity of the polymerizing mass reaches 50 poises, and thereafter maintaining the polymerizing mass at a temperature of at least 35° C. with the mold in vertical position until the polymerizing mass is more or less solid, that is, has reached a state of solidification so that further movement of the light-reflecting lamella would not be possible.

In a preferred and more specific form, the invention is carried out by adding a photopolymerization and a thermal polymerization catalyst to a mixture of light-reflecting lamellae and a polymerizable liquid organic compound, introducing the resulting mixture into a mold such as the cells for casting sheets disclosed in Rohm et al. U. S. Patent 2,154,639, these cells usually being composed of two glass plates separated by a compressible gasket, subjecting one or both sides of the cell to an appropriate source of light while maintaining the cell in a substantially horizontal position until the desired pattern appears, and thereafter completing the polymerization by thermal means while the cell is maintained in a substantially vertical position.

Copending U. S. applications Serial No. 770,887 and Serial No. 3,714, filed August 27, 1947, and January 22, 1948, respectively, both in the name of B. M. Marks, deal with methods for producing integral patterns having integral sheen in cast synthetic resin. The present invention resides to an important degree in the discovery that modifications of the patterns produced according to the methods of the above copending applications can be brought about by varying the position of the mold during polymerization. In the preferred form of the invention the mold is placed in a substantially vertical position in a water bath at an elevated temperature after a primary pattern has been developed in the polymerizing body by exposure to actinic energy. It has been discovered that completing the polymerization by thermal means while the mold is maintained in a vertical position brings about a modification of the pattern already developed in the polymerizing body owing to a turbulence created therein. It is believed that the turbulence is created by thermal convection currents set up in the polymerizing body upon subjecting the mold containing the polymerizing body to an elevated temperature. Regardless of theories, however, a modified form of the primary pattern formed upon exposure to actinic energy is developed when the polymerization is completed while maintaining the mold in a vertical position. Obviously, the type of molds used for following the method of this invention must have at least one dimension less than the other two so that it is distinguishable when the mold is in a substantially horizontal or vertical position.

The degree to which the primary pattern is modified upon completion of the polymerization by thermal means in a vertical position depends upon the viscosity of the polymerizing body at the time the mold containing said polymerizing body is changed from a horizontal to a vertical position. Hence, if the polymerizing body has attained too great a viscosity after preliminary exposure to actinic energy, substantially no turbulence will be set up in the polymerizing body and the final pattern will conform to the primary pattern formed by exposure to actinic energy. In actual practice it has been discovered that viscosities greater than 50 poises at the prevailing temperature of the polymerizing body which, at this stage, will not usually vary importantly from room temperature, are too great to allow sufficient turbulence to modify the primary pattern. By the same token, the lower the viscosity the more turbulence will be set up in the polymerizing body and the greater will be the degree of modification of the primary pattern.

The method of this invention is applicable to producing modified forms of the types of pearlescent integral patterns described in the aforementioned copending applications. Hence, various types of masking means may be used on one or both sides of a mold to control the transmission of actinic energy so that certain areas of the polymerizing body in a mold receive more energy than do adjacent areas as described in copending application U. S. Serial No. 770,887. The use of such masking means permits the development of various types of geometric or random patterns in the polymerizing body which may be modified by following the method of this invention. Integral mottled patterns as described in copending application U. S. Serial No. 3,714 may also be modified according to the method of this invention.

The following variables appear to have an effect upon the appearance of the primary patterns developed according to the techniques described in the aforementioned copending applications: viscosity of the liquid polymerizable organic compounds, catalyst concentration, concentration of light-reflecting lamellae, concentration of dye or pigment, time of exposure to actinic energy, position of mold during polymerization, intensity of actinic energy and method of pouring the polymerizable compound into the mold. Patterns may be substantially reproduced according to the method of this invention by duplicating any one set of conditions.

The most important of the above-mentioned variable appear to be the viscosity of the polymerizable liquid, time of exposure to actinic energy, intensity of the actinic energy, and the position of the mold during irradiation. In order to maintain a uniform dispersion of the light-reflecting lamellae, it is preferred that the polymerizable liquid organic compound should have a viscosity of at least 5 poises, and preferably about 15 poises at room temperature when it is introduced into the mold. In syrups having viscosities lower than 5 poises, there is a tendency for the larger particles of light-reflecting lamellae to settle out and, consequently, a predominant pattern will be produced on only the lower side of the sheet or body being cast. However, syrup of such viscosities can be used when such an effect is desired. Polymerizable liquids having viscosities greater than approximately 40 poises at room temperature when it is introduced into the mold are too viscous to allow the formation of a reproducible primary pattern in the polymerizing body upon the exposure to actinic energy. By the same token, the primary pattern will appear more rapidly in the polymerizing body when polymerizable liquids of low viscosities are used. Actinic energy of high intensity will also accelerate the formation of the primary pattern in the polymerizing body.

Providing that the suspension of light-reflecting lamellae in the polymerizable liquid has a viscosity of less than 40 poises, the appearance of a pattern upon exposure of the mold to actinic energy will always result before the viscosity of the suspension at the prevailing temperature, which will be relatively low, reaches 50 poises. Although the mold may be turned into vertical position immediately after the primary pattern has appeared, it is essential, according to this invention, that the mold should be turned into vertical position before the viscosity of the polymerizing mass in the mold reaches 50 poises as, otherwise, the modifying effect on the pattern, which is the main object of the present invention, will be lost entirely or so negligible as to have no practical value.

Figure 4:
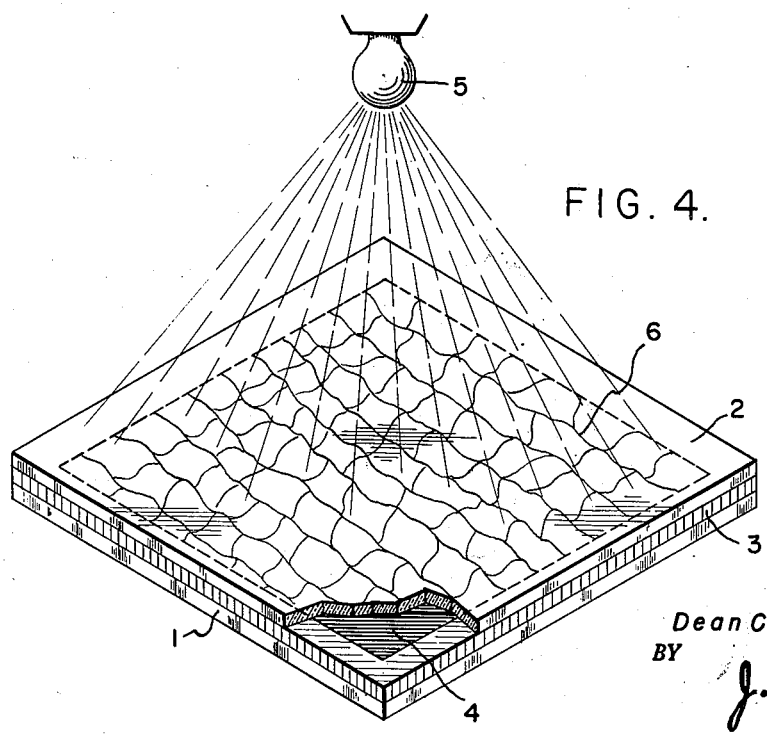
Figure 2:
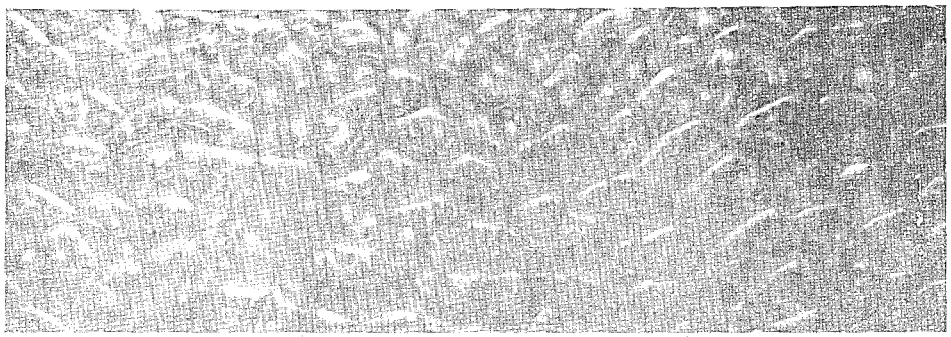
Figure 3:

A method of carrying out this invention will be more particularly described with reference to the accompanying drawing wherein:

Fig. 1 is a perspective view, more or less diagrammatic, of an apparatus for carrying out the present invention, parts being broken away for purposes of illustration;

Fig. 2 is a photographic elevation of the face of a square section of cast sheet made by the apparatus shown in Fig. 1. This pattern is a type of mottled pattern made by the technique described in copending application U. S. Serial No. 3,714, unmodified by the method of the present invention;

Fig. 3 is a photographic elevation of the face of a square section of a cast sheet made by the apparatus shown in Fig. 1 except that the primary pattern formed by exposure to actinic energy was modified by the method of this invention. The primary pattern developed was similar to Fig. 2, and modification thereof was effected by completing the polymerization in a water bath while the cell was maintained in vertical position;

Fig. 4 is a perspective view of an apparatus similar to that illustrated in Fig. 1 except that a pattern is scribed on one side wall of the glass cell with a china marking pencil in order to control the transmission of the actinic energy so that certain areas of the polymerizing body in the cell receive more energy than do adjacent areas. This technique is more fully described in copending application U. S. Serial No. 770,887; and U. S. Serial No. 3,714.

Figure 5:
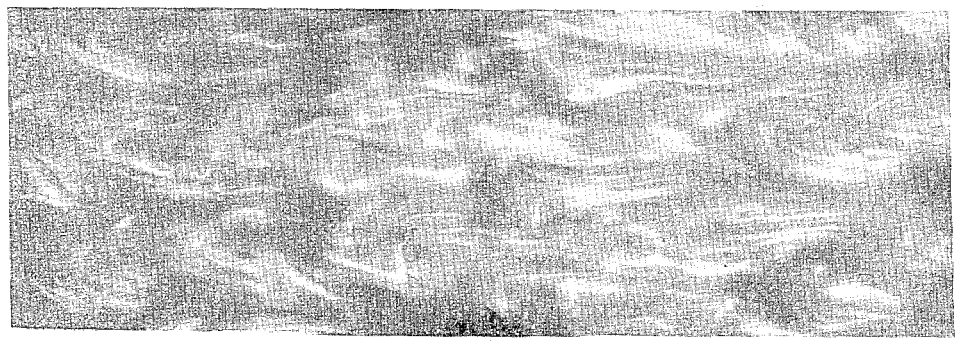

Fig. 5 is a photographic elevation of the face of a square section of a cast sheet made by the apparatus shown in Fig. 4, the primary pattern developed being modified according to the method of this invention.

Referring to Fig. 1 there is shown in horizontal position a conventional cell assembly for casting of sheets. The cell is composed of glass plates 1 and 2 separated by a compressible gasket 3. Disposed in the cell is the polymerizable liquid organic compound 4 containing suspended light-reflecting lamellae, a photopolymerization catalyst and a thermal polymerization catalyst. The lamellae are not oriented at this stage and, because the broad faces of the lamellae are disposed at random, there is no sheen effect at all. It is only by the orientation of lamellae so that a great majority in any particular area face parallel to surface of the sheeting that a sheen effect is attainable.

A light source is designated by reference numeral 5, such source being an emitter of ultraviolet, visible, or infrared light, or a combination of these. The cell is positioned beneath the light source 5 and polymerization of the contents of the cell is effected by energizing the light source until a desired pattern appears. If the primary pattern developed is not to be modified, the polymerization may be completed by thermal means while the cell is maintained in a horizontal position, or polymerization may be completed by further exposure to actinic energy if a pattern of maximum gradation of contrast is desired. An unmodified pattern is illustrated in Fig. 2. This procedure and the pattern obtained are typical of the invention disclosed in Serial No. 3,714. If, however, a modified pattern of the type illustrated by Fig. 3 is desired, polymerization is preferably completed in a water bath at an elevated temperature while maintaining the cell in a vertical position in accordance with the present invention.

Fig. 4 is similar to Fig. 1 except that on the outer side of one of the glass side walls 2 is scribed a type of pattern 6 conforming to the general configuration of a mottled pattern. By employing this technique, the general configuration of the primary mottled pattern or any type of primary pattern may be substantially predetermined, and by duplicating the conditions the final modified pattern can be substantially reproduced. This technique is described in copending application U. S. Serial No. 770,887. Fig. 5 represents a modified mottled pattern produced with the apparatus of Fig. 4 and modified according to the present invention. The pattern in Fig. 5 differs somewhat from that illustrated by Fig. 3. The differences in the appearance of the patterns can be made more pronounced by varying the configuration of the pattern used as the masking means.

The invention is applicable to castings in general as long as one dimension of the mold is less than the other two. The preferred type of mold is a cell of the type hereinbefore described, and either one or both sides of the cell may be exposed to the source of actinic energy. If both sides of the cell are irradiated, the sources of actinic energy should be similar and should be positioned at corresponding distances with respect to the surfaces of the cell in order to obtain substantially similar patterns on both sides of the casting.

The following examples wherein all proportions are given by weight unless otherwise specified, illustrate specific embodiments of the present invention.

*Example I*

Monomeric methyl methacrylate containing 0.002% of benzoyl peroxide as a thermal polymerization catalyst was heated at 70° C. until it thickened to a syrup having at room temperature a viscosity of about 10 poises. Using this syrup the following formulation was prepared:

| | Parts |
|---|---|
| Methyl methacrylate syrup | 3300 |
| Paispearl paste (a paste of pearl essence from fish scales dispersed in cellulose nitrate solution) | 11 |
| Alpha, alpha'azobis(alpha,gamma, dimethylvaleronitrile) (thermal and photopolymerization catalyst) | 0.25 |

After thorough mixing, the above formulation was poured into a conventional sheet casting cell (20" x 20") composed of two plates of glass ¼" thick and an interposed compressible gasket adapted to give a finished sheet 0.375" in thickness.

The filled cell was placed in a horizontal position 30" beneath a mercury vapor lamp and irradiated for a period of 2¼ hours at room temperature. A mottled pattern was developed within the polymerizing body during the period of irradiation. The cell was then removed from beneath the lamp and placed in a water bath at 54° C. and maintained in a vertical position until polymerization was complete. The final pattern, similar to that shown in Fig. 3, was substantially modified from the primary pattern formed after exposure to the actinic energy.

In this example and those following, the viscosity of the polymerizing body at the time the cell is being turned into vertical position was not even approaching 50 poises. So long as the viscosity is below 50 poises, it is not a critical factor. Once the primary pattern has appeared, the cell may be turned regardless of how low the viscosity may be although the viscosity will always be appreciable since it naturally will be built up to some extent before the primary pattern appears. However, if the final pattern is to be duplicated, then the viscosity of the polymerizing body at the time the cell is turned into vertical position must be practically identical each time. This is normally insured simply by exposing to actinic energy of the same intensity and for the same duration each time.

*Example II*

Monomeric methyl methacrylate containing 0.0025% of lauroyl peroxide as a thermal polymerization catalyst was heated at 70° C. until it thickened to a syrup having at room temperature a viscosity of about 23 poises. Using this syrup the following formulation was prepared:

| | Parts |
|---|---|
| Methyl methacrylate syrup | 900 |
| Paispearl paste | 3 |
| Benzoin | 2.6 |
| Alpha,alpha'azobis(alpha,gamma,dimethyl-valeronitrile) | 0.065 |

After thorough mixing, identical charges of the above formulation were poured into two similar sheet casting cells (12"x12") of the type described in Example I, each adapted to give a finished sheet 0.375" in thickness. On the outer surface of one of the cell side walls was scribed with a china marking pencil a pattern which resembled the general pattern configuration of a mottled pattern as shown in Fig. 4. Both of the cells were placed in a horizontal position 4" beneath a bank of four BL–360 lights for a period of 1 hour at room temperature (BL–360 fluorescent lights produce "black light" of maximum intensity at approximately 3600 Angstrom wave length). The scribed side wall of the one cell was uppermost. Polymerization was then completed by immersing the cells in a water bath at 54° C., the cells being vertically positioned therein. After the exposure to the lights, a type of mottled pattern was developed in each of the cell contents, the general configuration of the mottled appearance being different in each owing to the masking effect provided on one of the cell side walls by means of the china marking pencil. The primary mottled patterns developed in each of the cells were substantially modified.

The modified mottled patterns developed in each of the cast sheets according to this example are illustrated by Figs. 3 and 5, Fig. 5 illustrating the pattern resulting from scribing a pattern on one of the cell side walls.

*Example III*

A syrup of methyl methacrylate was prepared by heating the monomer with 0.002% of benzoyl peroxide at 70° C. until a viscosity of about 18 poises was obtained. Using this syrup the following formulation was prepared:

| | Parts |
|---|---|
| Methyl methacrylate syrup | 700 |
| Paispearl paste | 18 |
| Purple dye | 4.5 |
| Benzoin-(photopolymerization catalyst) | 0.8 |
| Alpha,alpha'azobis(alpha,gamma,dimethyl-valeronitrile) | 0.05 |

After thorough mixing, the above formulation was poured into a conventional sheet casting cell (12"x12") composed of two plates of glass ¼" thick and an interposed compressible gasket adapted to give a finished sheet ¼" in thickness.

The outer surface of one of the cell side walls was masked with a cardboard template which divided the surface into four equal sections. The cardboard was cut so that a different type of pattern was formed in each of the four sections. One area was masked with a pattern consisting of ½" squares separated by 1/16" boundaries, another pattern consisted of 1/16" strips each ½" apart, another section contained 1/16" parallel strips each one ½" apart but running perpendicular to the strips in the other section, and the fourth section contained ½" diameter circular holes with ¾" between centers. The cell was then placed in a horizontal position 15½" beneath a quartz mercury vapor lamp, the masked side being uppermost. After irradiating for 30 minutes, the primary patterns developed in each of the four sections substantially corresponded to the pattern represented by the masking template for each of the four sections. Polymerization was then completed in a water bath at 54° C. while the cell was maintained in a vertical position. The resulting patterns in each of the four sections were modified from the primary patterns, straight lines being somewhat billowed.

*Example IV*

Monomeric methyl methacrylate containing 0.0029% of lauroyl peroxide, was heated at 70° C. until it thickened to a syrup having at room temperature a viscosity of about 23 poises. Using this syrup the following formulation was prepared:

| | Parts |
|---|---|
| Methyl methacrylate syrup | 900 |
| Paispearl paste | 3 |
| Benzoin | 2.6 |
| Alpha,alpha'azobis(alpha,gamma,dimethyl-valeronitrile) | 0.065 |

After thorough mixing the above formulation was poured into a conventional sheet casting cell (12"x12") composed of two plates of glass ¼" thick and an interposed compressible gasket adapted to give a finished sheet 0.375" in thickness. The loaded cell was then tilted at an angle of 25° to the horizontal and placed 4" beneath a bank of four BL–360 lights for a period of one hour. The lights were also tilted at an angle of 25° so that rays of light were propagated substantially perpendicular to the surface of the cell. After irradiation for one hour, the cell was then placed in a vertical position in an air oven at 54° C. to complete the polymerization. A modified mottled pattern was developed in the casting, but the general configuration was somewhat different from that produced by irradiating the cell in a horizontal position instead of at a slight angle to the horizontal.

The above examples are merely illustrative and the invention broadly comprises subjecting in substantial horizontal position to irradiation by actinic energy a mold containing a suspension of light-reflecting lamellae in a polymerizable liquid until a pattern develops in the polymerizing mass and then turning the mold into vertical position to complete the polymerization at an elevated temperature above 35° C.

Neither the specific type of mold, always providing its walls permit transmission of actinic energy and one dimension is less than the other two, nor the specific type of actinic energy is limited in this invention. After the mold is turned to vertical position, it still may be irradiated with actinic energy although this generally is not preferred as it tends to cause difficulties in dissipating the exothermic heat from the polymerizing body. Regardless of whether irradiation is continued or not, the temperature of the polymerizing body after the mold is turned vertically, must be at least mildly elevated.

It has been found that a temperature of 35° C. or higher is necessary in carrying out the polymerization with the mold in vertical position. A temperature of 50° C. to 90° C. is preferred although temperatures up to 130° C. can be used depending upon the various factors well known to those skilled in the art of casting polymerizable organic compounds. The selection of an optimum temperature under any given conditions will be based on the usual considerations of the prior art and will not be appreciably influenced by any specific considerations relating to the instant invention. While the thermal polymerization is generally carried out most conveniently by immersing the mold in a water bath, other liquids or heated gases may be used.

The invention is manifestly applicable broadly to liquid organic compounds that may be polymerized to polymers solid at ordinary temperatures. Obviously, the invention is of greater value as applied to those compounds which give solid polymers of the most useful properties and, normally the invention will be applied to organic compounds which give rigid castings. Unlike processes involving the precise chemical reaction of one compound with another where the specific action of untried compounds is difficult to predict, the present invention simply requires, for operativeness, that the compound used be a liquid in monomeric form and polymerizable to a solid; beyond that requirement, selection of a specific polymerizable compound will be dictated by the properties desired in the finished casting, cost, ease of polymerization, and such factors entering into the selection of polymerizable compounds for casting processes generally.

A large class of liquid organic compounds adapted for use in this invention are the ethylenically unsaturated compounds which are polymerizable by the action of light or heat, either alone or in admixture with one or more similar compounds. Among such compounds are the amides, esters and nitriles of acrylic, chloroacrylic and alkacrylic acids, e. g. methacrylamide, methyl acrylate, methyl chloroacrylate, methyl methacrylate, ethyl methacrylate, butyl methacrylate, ethoxyethyl methacrylate, glycol dimethacrylate, methyl ethacrylate, ethyl ethacrylate, acrylonitrile, methacrylonitrile; other vinyl and vinylidene compounds, e. g., vinyl acetate, vinyl chloride, vinylidene chloride, vinyl ethers, styrene, methyl styrene, allyl chloride and dimethyl itaconate. Numerous other organic compounds possessing the requisite properties herein discussed will readily occur to those skilled in the art.

It is an essential part of this invention that light-reflecting lamellae be mixed with the polymerizable liquid organic compound, and such materials included under this classification are well known in the art. For example, the well known pearl essence obtained from fish scales, mercurous chloride, basic lead carbonate "pearl" pigment, lead iodide in the form of light-reflecting lamellae, and numerous metal bronzing powders such as aluminum-bronze "pearl," "gold" bronze, copper-aluminum alloy bronzes and the like may be used. Normally, from 0.005% to 20%, by weight of the polymerizable liquid compound, will be used although, manifestly, a proportion outside this range may be used if it gives the desired effect.

Except with polymerizable compounds which are exceedingly readily polymerized, the use of a polymerization catalyst is advisable. Since the polymerization is to be completed by thermal means, it is recommended that a combination of a thermal and photopolymerization catalyst be used. Various photopolymerization catalysts are disclosed in Agre, U. S. Patents 2,367,660 and 2,367,661, and Howk et al., U. S. Patent 2,413,973, including the proportions in which they are conventionally used. Suitable photopolymerization catalysts include benzoin and similar vicinal ketaldonyl and acyloin compounds as disclosed in the above Agre patents and various azo-type catalysts such as alpha,alpha'azodiisobutyronitrile, as disclosed in Salisbury U. S. application Serial No. 655,013, which latter may also function as thermal polymerization catalysts. These various catalysts will be used in such catalytic amounts as they would be in any ordinary casting operation, the present invention not requiring any specific variation from such proportions.

Thermal polymerization catalysts which may be used include benzoyl peroxide, lauroyl peroxide, acetyl benzoyl peroxide, diacetyl peroxide, tertiary butyl perbenzoate, p-chloro benzoyl peroxide, and such azo catalysts as alpha,alpha'azodiisobutyronitrile. In several of the examples, an azo catalyst was used in conjunction with a peroxide catalyst. This combination is by no means essential in carrying out the invention but it is efficient. The peroxide catalyst is used in very low concentration and serves as the catalyst in thickening the monomer to a syrup, but at the end of this period this catalyst is substantially used up and the azo catalyst subsequently added serves as the primary thermal polymerization catalyst when polymerization is completed by thermal means.

Various dyestuffs, plasticizers, lubricants, and other modifiers may be incorporated with the polymerizable liquid organic compounds to obtain certain desired characteristics in the finished product, according to well-known practices in the art. It is ordinarily preferable to start with the polymerizable liquid organic compound in partially polymerized condition, i. e., as a more or less viscous syrup rather than with straight organic liquid. The use of syrup shortens the duration of the process and also reduces any tendency of the light-reflecting lamellae to settle out under the influence of gravity as described hereinbefore.

It will be obvious that once the polymerizing body solidifies to a point where further movement of the lamellae therein is prevented, it becomes immaterial whether the mold is kept in vertical position or not. It is usually more convenient to leave the mold in this position until polymerization is complete but this invention is not limited to this as, once the lamellae are immobilized, the mold may be changed in position or even removed entirely and polymerization completed in other apparatus.

An outstanding advantage of the present invention is that it provides a highly practical and convenient means of obtaining cast synthetic resin sheets or other bodies having integral sheen. A further advantage is that the invention provides a simple, economical, and effective way of directly casting synthetic resin sheets having integral sheen. A further advantage of the invention is that it provides a means of obtaining synthetic resin sheets and the like, with integral sheen, having modified forms of the types of patterns which can be obtained by following the techniques of copending applications U. S. Serial No. 770,887 and U. S. Serial No. 3,714.

As many apparently widely different embodiments of this invention may be made without departing from the spirit and scope thereof, it is to be understood that the invention is not limited to the specific embodiments thereof except as defined in the appended claims.

I claim:
1. Process of preparing cast synthetic resin having integral sheen which comprises forming a suspension of light-reflecting lamellae in a polymerizable liquid organic compound adapted to give a polymer solid at normal temperatures, said suspension having a viscosity of less than 40 poises, introducing said suspension into a mold having one dimension less than the other two and capable of transmitting actinic light to the contents thereof, subjecting said mold while in substantially horizontal position to a source of actinic light to induce polymerization of said mold contents until a pattern appears in the polymerizing mass contained in said mold, turning said mold into substantially vertical position before the viscosity of said polymerizing mass reaches 50 poises, and therafter maintaining said polymerizing mass at a temperature of 35° C. to 130° C. with said mold in vertical position until said polymerizing mass is substantially solid.

2. Process of preparing cast synthetic resin having integral sheen which comprises forming a suspension of light-reflecting lamellae in a polymerizable liquid organic compound adapted to give a polymer solid at normal temperatures, said suspension having a viscosity of less than 40 poises, introducing said suspension into a cell composed of two plates separated by a compressible gasket, at least one of said plates being capable of transmitting actinic light to the contents of said cell, subjecting said cell while in substantially horizontal position to a source of actinic light to induce polymerization of said mold contents until a pattern appears in the polymerizing mass contained in said cell, turning said cell into substantially vertical position before the viscosity of said polymerizing mass reaches 50 poises, and thereafter maintaining said polymerizing mass at a temperature of 35° C. to 130° C. with said cell in vertical position until said polymerizing mass is substantially solid.

3. Process of preparing cast synthetic resin having integral sheen which comprises forming a suspension of light-reflecting lamellae in a polymerizable liquid organic compound adapted to give a polymer solid at normal temperatures, said suspension having a viscosity of less than 40 poises, introducing said suspension into a cell composed of two plates separated by a compressible gasket, at least one of said plates being capable of transmitting actinic light to the contents of said cell and having areas thereof covered with material resistant to the transmission of actinic light therethrough, subjecting at least said plate covered with said material to a source of actinic light to induce polymerization of said cell contents with said cell in substantially horizontal position until a pattern appears in the polymerizing mass contained in said cell, turning said cell into substantially vertical position before the viscosity of said polymerizing mass reaches 50 poises, and thereafter maintaining said polymerizing mass at a temperature of 50° C. to 90° C. with said cell in vertical position until said polymerizing mass is substantially solid.

4. Process as set forth in claim 1 wherein said polymerizable liquid organic compound is methyl methacrylate.

5. Process as set forth in claim 1 wherein said polymerizable liquid organic compound is methyl methacrylate containing both a photopolymerization catalyst and a thermal polymerization catalyst.

6. Process as set forth in claim 2 wherein said polymerizable liquid organic compound is methyl methacrylate.

7. Process as set forth in claim 2 wherein said polymerizable liquid organic compound is methyl methacrylate containing both a photopolymerization catalyst and a thermal polymerization catalyst.

8. Process as set forth in claim 3 wherein said polymerizable liquid organic compound is methyl methacrylate.

9. Process as set forth in claim 3 wherein said polymerizable liquid organic compound is methyl methacrylate containing both a photopolymerization catalyst and a thermal polymerization catalyst.

DEAN CRAWFORD ROGERS.

REFERENCES CITED

The following references are of record in the file of this patent:

UNITED STATES PATENTS

| Number | Name | Date |
|---|---|---|
| 2,265,226 | Clewell et al. | Dec. 9, 1941 |